United States Patent [19]

Blodgett

[11] 3,724,569
[45] Apr. 3, 1973

[54] METHOD AND APPARATUS FOR CONTROLLING PRODUCT CHARGE WEIGHTS

[76] Inventor: Stewart B. Blodgett, 12322 Mosscup Dr., Houston, Tex. 77024

[22] Filed: Oct. 29, 1970

[21] Appl. No.: 85,271

Related U.S. Application Data

[62] Division of Ser. No. 775,858, Nov. 14, 1968, Pat. No. 3,643,752.

[52] U.S. Cl. .................. 177/1, 177/60, 177/116
[51] Int. Cl. ............................................. G01g 19/00
[58] Field of Search........177/1, 17, 50, 60, 116, 122, 177/70, 123, 210, 211, 164, DIG. 1, DIG. 3, 119, 120

[56] References Cited

UNITED STATES PATENTS

| | | | |
|---|---|---|---|
| 2,628,055 | 2/1953 | Knobel et al. | 177/50 X |
| 2,664,557 | 12/1953 | Sargrove | 177/210 UX |
| 2,688,458 | 9/1954 | Schieser et al. | 177/50 |
| 2,688,459 | 9/1954 | Merrill et al. | 177/50 |
| 2,697,580 | 12/1954 | Howard | 177/50 X |
| 2,746,739 | 5/1956 | Philippovic | 177/210 X |
| 3,053,332 | 9/1962 | Buchtenkirch et al. | 177/210 X |
| 3,116,801 | 1/1964 | Bauder et al. | 177/210 X |
| 3,172,491 | 3/1965 | Mainey | 177/122 X |
| 3,193,029 | 7/1965 | Harvison et al. | 177/122 X |
| 3,291,233 | 12/1966 | Mayer | 177/1 X |
| 3,464,508 | 9/1969 | Engle et al. | 177/211 X |
| 3,476,198 | 11/1969 | Francis | 177/50 |
| 3,477,529 | 11/1969 | Burn et al. | 177/70 X |
| 3,484,813 | 12/1969 | Davies | 177/164 X |
| 3,498,395 | 3/1970 | Henry | 177/1 |

Primary Examiner—Richard B. Wilkinson
Assistant Examiner—Stanley J. Witkowski
Attorney—Larson and Taylor

[57] ABSTRACT

A method of controlling the weights of product charges and reducing product giveaway is provided wherein a predetermined percentage of charges are deliberately held underweight so that a high percentage of the charges are delivered at a weight near the minimum acceptable level. The underweight charges are then brought up to weight by adding additional product so that all charges are delivered at weights above the minimum. A method for maintaining the predetermined percentage of underweight charges is also provided wherein the total number of charges and the number of underweight charges are compared to determine whether the predetermined percentage is being maintained and a resultant control signal produced to increase or decrease the amount fed where the percentage is not maintained.

5 Claims, 4 Drawing Figures

INVENTOR
STEWART B. BLODGETT

*Larson, Taylor and Hinds*

ATTORNEY

METHOD AND APPARATUS FOR CONTROLLING PRODUCT CHARGE WEIGHTS

This is a division of application Ser. No. 775,858, filed on Nov. 14, 1968, now U.S. Pat. No. 3,643,752.

FIELD OF THE INVENTION

The present invention relates to weighing charges of a product and more particularly to an improved method and apparatus for controlling the weight of such charges.

BACKGROUND OF THE INVENTION

A serious problem in the weighing or measuring of product charges at practical production speeds is that variations in the weights of the charges produced are unavoidable. These variations result from variations in product density, in feed characteristics and in the head load in the supply hoppers as well as from short term changes in the thickness of the bed of product being fed to the scales or other measuring devices. Where it is desired to produce charges whose weights all fall above a predetermined minimum level it is necessary to "give away" a certain amount of product in order to ensure that the weights of the lightest charges do not fall below that level. This concept will be discussed in more detail hereinbelow but at this point it should at least be noted the value of product given away under this approach can be quite substantial.

In general, a number of approaches have been taken in attempting to control the weight of product charges. For example, in a common approach upper and lower feeder and scale arrangements are utilized, the upper feeder and scale arrangement weighing out a "bulk" charge which is dumped into the weigh bucket of the lower arrangement, a "dribble" feeder in the lower arrangement bringing the charge up to weight. In this approach while the charge is being brought up to weight the upper scale weighs the following charge and hence the process is continuous, the lower dribble feeder being normally operated for each charge. In another approach, weight control systems have been developed which attempt to determine the average charge weight produced and to hold this weight at a predetermined level. This approach may prevent underweights in certain short term uses but where, for example, the particle sizes of the product becomes large and thus the distribution curve corresponding to the range of charges produced becomes larger, underweight charges will result. In another approach two weight limits are set and each time a charge is encountered which falls without these limits, that is, either above or below, a correction is produced. In a modified version of this approach an occasional weight falling without the preset limits is disregarded and a correction is produced only where two or more weights in a row are found to fall below (or above) these limits. In yet another approach, and one of obvious complexity, weight signals are fed to a computer which calculates the necessary corrections.

SUMMARY OF THE INVENTION

In accordance with the present invention an improved method for controlling the weight of charges of product is provided which prevents the underweight filling of packages as well as reducing product giveaway. In accordance with a further feature thereof the method also provides compensation for variations in product particle size and/or the feed characteristics of whatever feed system is utilized.

In general, the present invention is directed to methods wherein the weights of charges produced are controlled by maintaining a given ratio between charges falling below a predetermined level, i.e., underweight charges, and charges falling above that level. In order to reduce product giveaway this ratio is selected such that the difference between the mean charge weight produced and the minimum acceptable weight is reduced so that more charges fall near the minimum. The resultant underweight charges produced by the selection of this ratio are then brought up to weight. This approach of the present invention should be contrasted with that discussed above wherein the mean charge weight was selected to be high enough that the lightest charges which could statistically be produced in accordance with the distribution curve corresponding to that weight will still fall above the minimum acceptable range. This prior art approach obviously provides a substantial amount of product giveaway in that the difference between minimum and mean weights is relatively large and relatively few of the lighter, yet acceptable, charges fall near the minimum.

The maintenance of the preselected ratio discussed above can be quite complicated. In accordance with a further feature of the invention a simple yet effective method is provided for maintaining this ratio wherein the total number of charges is counted and then compared with the number of charges falling below the minimum acceptable level. This comparison is then used to control the feed adjustment to ensure that the desired ratio between the compared quantities is achieved and maintained.

In accordance with a presently preferred embodiment of the invention the feeding and weighing portion of the system may be of the type discussed hereinabove wherein upper and lower feeder-scale arrangements are employed. However, in contrast to the system of the prior art, the lower feeder-scale arrangement, that is, the dribble feeder and associated weighing apparatus, is utilized to bring up to weight only that percentage of charges delivered underweight, the remaining charges being delivered at weights above the minimum acceptable level. As stated hereinabove in the prior art system the bulk feeder and dribble feeder cooperate to bring the charge up to final weight and thus the dribble feeder is operated for each charge. The remainder of the system of the present invention includes means for counting the total number of charges which in accordance with a specific embodiment comprises a stepping switch actuated by operation of the bulk feeder and means for counting the number of underweight charges, which again in accordance with a specific embodiment may be responsive to the actuation of the dribble feeder. The stepping switch is adapted to provide a control signal in accordance with a selected ratio, that is, where, for example, the selected ratio of underweight charges to charges above the minimum acceptable level is one in ten, a control signal will be produced for every tenth charge counted.

This signal is used to oppose a signal corresponding to the actual number of underweight charges and thus where the two signals occur an equal number of times the selected ratio is being maintained. However where, for example, the number of charges delivered underweight is greater than desired there will be an unbalance between the number of occurrences of the opposing signals. This unbalance is used to adjust the feed, in this case to increase the feed such that the percentage of underweight charges is brought up to the desired value.

Other features and advantages of the invention will be set forth in or apparent from the description of a preferred embodiment found hereinbelow.

DESCRIPTION OF THE PREFERRED EMBODIMENT

Before discussing an actual physical embodiment of the invention some background considerations will be explored. As stated hereinabove, the weights of product charges delivered by a feeder (either gravimetric or volumetric) are not identical. In fact, the distribution of charge weights approximates a standard Gaussian distribution curve such as shown in FIG. 1.

Figure 1:
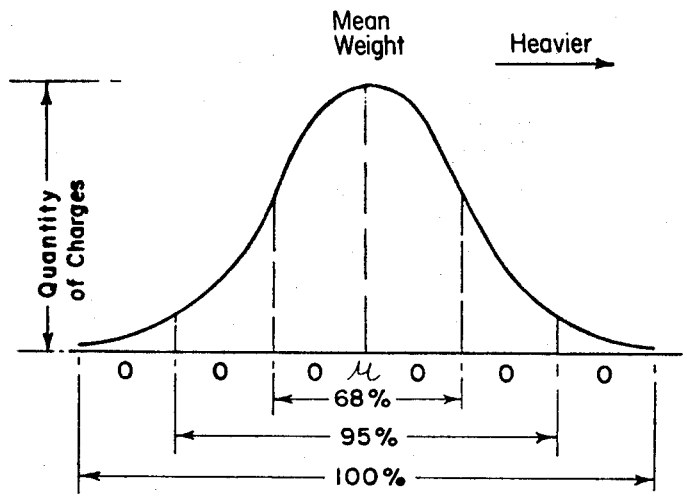
FIG. 1 is a representation of a standard distribution curve used in explanation of the invention.
Figure 2:
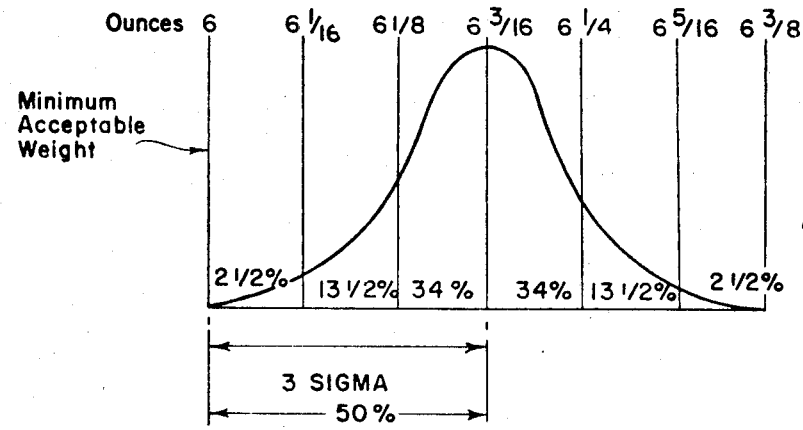
FIGS. 2 and 3 are representations of further distribution curves used in explanation of the invention.

Referring to FIG. 1, it can be seen that about 68 percent of the charges produced will fall within a range of $\pm 1$ sigma, about 95 percent of the charges fall within $\pm 2$ sigma and nearly 100 percent of the charges within $\pm 3$ sigma, the absolute value of sigma varying with the particular product, the speed of operation, the size of charge and other factors. As discussed, where it is desired to prevent charge weights from falling below a predetermined minimum it must be ensured that the lightest charges produced by the feeder fall above that minimum. Thus, to prevent underweights, the mean value of charge produced by the feeder must be chosen such that the minimum value of charge corresponding to that mean value falls above the desired minimum. Hence, referring to FIG. 2, for the exemplary values given in order to ensure that a minimum charge of 6 ounces is produced a mean value of 6 3/16 ounces is selected. Such an approach results in an average "giveaway" of 3 sigma. As indicated in FIG. 2, only 50 percent of the charges produced fall within the three lightest groups although 95 percent of the weights fall within $\pm \frac{1}{8}$ ounce of the mean weight.

Figure 3:
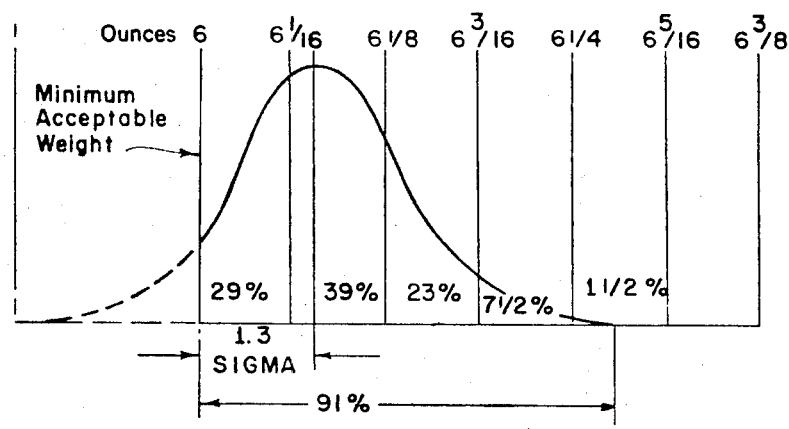

In accordance with the invention, giveaway is substantially reduced by intentionally setting the feeder to produce lighter charge weights. As indicated in FIG. 3, this approach results in a certain percentage of the charges being underweight. As discussed hereinbelow, these underweight charges are brought up to at least the minimum weight by adding product before delivering the final charge for packaging. In the example shown in FIG. 3, approximately 10% of the charges produced are underweight. By deliberately producing this percentage of underweight charges product "giveaway" is reduced from 3 sigma to 1.3 sigma and 91 percent of the weights fall within the three lightest groups as compared with 50 percent for the example discussed above. The approach of the present invention, for the specific example shown, saves at least 5 ¼ pounds of product per 1,000 packages.

Figure 4:
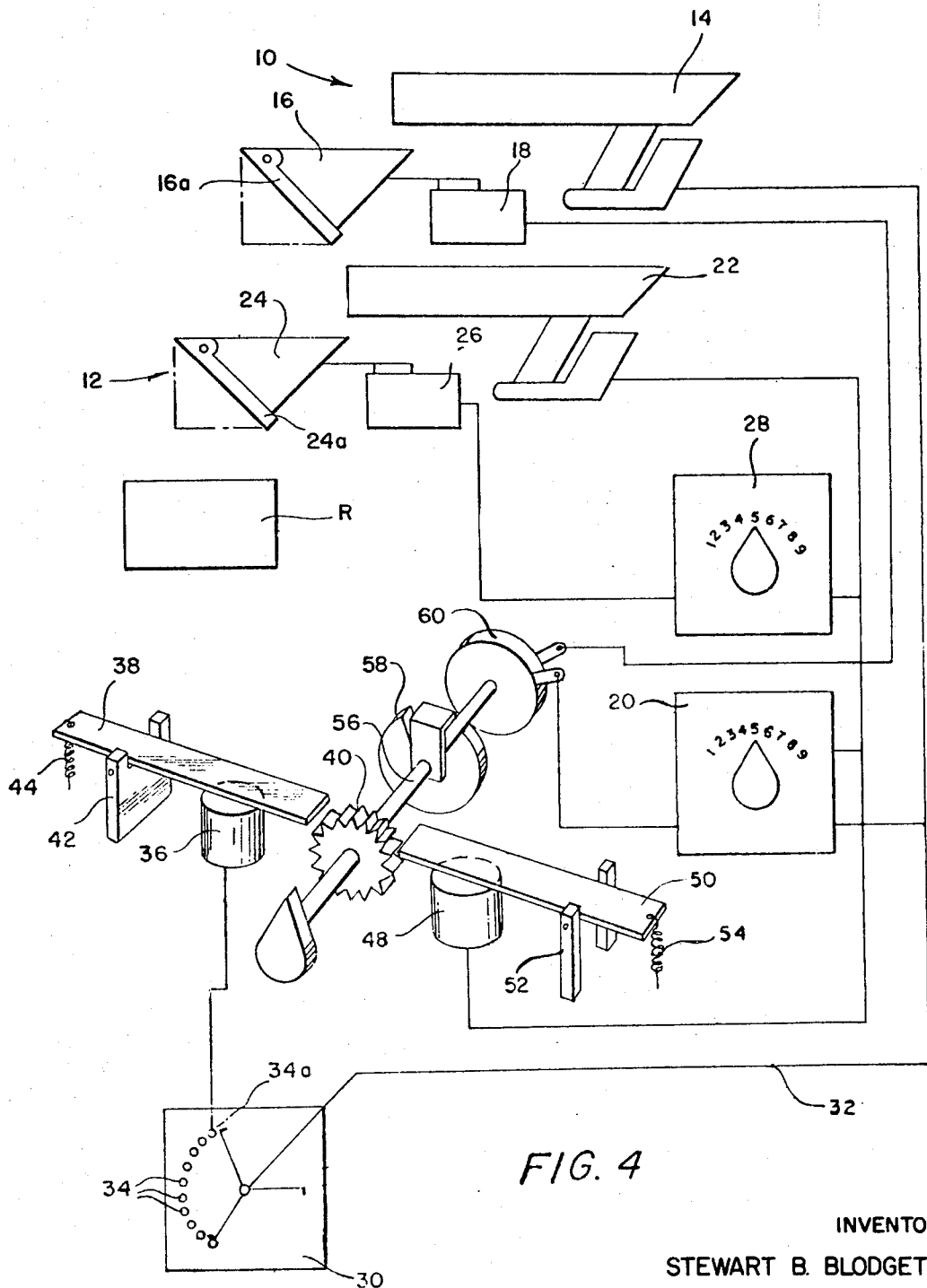
FIG. 4 is a schematic representation, partial in perspective, of a presently preferred embodiment of the invention.

Referring now to FIG. 4, a schematic representation of a presently preferred embodiment of the invention is shown. Although a gravimetric filler or feeder is shown in FIG. 1 it will be appreciated that for example a volumetric filler can also be employed. The embodiment of FIG. 4 includes upper and lower feeder-scale arrangements denoted 10 and 12. Upper arrangement 10 includes a vibratory feeder 14 which feeds product into a weigh bucket 16 which is supported by a conventional weigh cell 18. A control amplifier 20, responsive to a signal from weigh cell 18, controls a relay (not shown) for terminating power to vibratory feeder 14 and thus terminating the feed when a predetermined weight is reached. Emptying of weigh bucket 16 is effected through an operation of a mechanism (not shown) which causes weigh bucket door 16a to open when the feed is terminated.

Lower feeder-scale arrangement 12 includes an auxiliary vibratory feeder 22 which feeds product into a check bucket 24 positioned below weigh bucket 16 and adapted to receive the released charge thereof. A checkweigh cell 26 supports check bucket 24 as shown. A control amplifier 28 is preset to operate an internal relay (not shown) for terminating the power to feeder 22 when the minimum acceptable charge weight is sensed by checkweigh cell 26. After a suitable interval provided to permit checkweigh cell 26 to settle, normally closed relay contacts (not shown) in control amplifier 28 are energized. If the charge in checkweigh bucket 24 is less than the predetermined minimum a circuit is completed for energizing auxiliary feeder 22 so that feeder 22 will cause product to be fed to checkweigh bucket 24 until the minimum weight is reached. At this time the relay coil in amplifier 28 is energized and the power to vibratory feeder 22 is interrupted as discussed above, the relay coil opening the normally closed contacts (not shown) in the control circuit for the vibratory feeder 22. At the same time the normally open relay contacts (not shown) in the dump control circuit for checkweigh bucket 26 are closed to permit dumping of checkweigh bucket 24. A receptacle R, which may be an open package to be filled, is positioned below checkweigh bucket 24 to receive the contents thereof when door 24a is opened. The weight of the charge in checkweigh bucket 24 is recorded before dumping thereof by conventional means (not shown).

As stated hereinabove in accordance with an important feature of the invention, a certain percentage of underweight charges is deliberately produced. For the example shown in FIG. 3 the mean weight of charges produced in the weigh bucket 16 is held to approximately 1.3 sigma above the minimum acceptable weight. Standard statistical tables show that 90.32 percent of the charges will fall above the point $-1.3$ sigma and 9.68 percent will fall below that point. Thus if about 10 percent of the charges are held under the minimum acceptable level the desired operating point on the distribution will be approximated.

In accordance with a further feature of the invention, novel means are provided for maintaining a desired percentage of underweights. These means include a stepping switch 30 and an associated coil (not shown) which is connected to the control circuit for vibratory feeder 14 via electrical lead 32 and which is energized each time vibratory feeder 14 is energized. Stepping switch 30 includes a series of 10 stationary contacts 34 the last of which, denoted 34a, is connected to electromagnet 36. Electromagnet 36 controls movement of an armature 38 which in turn controls the rotation of a ratchet wheel 40. Armature 38 is pivoted at pivot 42 and spring biased by spring 44 at one end thereof out of engagement with ratchet wheel 40. Energization of electromagnet 36 causing pivoting of armature 38 such that the other end thereof engages ratchet wheel 40 and causes rotation thereof one tooth counterclockwise. Hence every tenth charge produced by feeder-scale arrangement 10 causes a one step counterclockwise rotation of ratchet wheel 40 to thus provide a count of the total number of charges.

As described hereinabove the control amplifier 28 is set to operate an internal relay (not shown) at the minimum acceptable weight level. Thus every underweight charge arriving in checkweigh bucket 24 will cause vibratory feeder 22 to operate until the minimum weight level is reached. The control circuit for vibratory feeder is connected through electrical conductor 46 to a second electromagnet 48 so that each time vibratory feeder 22 is energized there will be consequent energization of electromagnet 48. Electromagnet 48 controls an armature 50 which, similarly to armature 38 described above, controls rotation of ratchet wheel 40. Armature 50 is pivoted at pivot 52 and spring biased out of engagement with ratchet wheel 40 by spring 54. When electromagnet 48 is energized, the non-spring biased end of armature 50 engages ratchet wheel 40 and causes clockwise rotation thereof one tooth. Thus electromagnetic 48 provides rotation of ratchet wheel 40 one step in a clockwise direction for each underweight charge.

Ratchet wheel 40 is rotatably mounted on a shaft 56 which is connected through a coupling mechanism 58 to the wiper arm (not shown) of a potentiometer 60. Potentiometer 60 is connected in series between the weigh cell 18 and control amplifier 20 and thus controls the weight level at which the internal relay in control amplifier 20 operates. Lost motion between the two major elements comprising coupling mechanism 58 prevents changes in the setting of potentiometer 60 for minor variations in the angular position of ratchet wheel 40, e.g., changes of few rotational steps only. However, for a more definite trend in the movement of ratchet wheel 40, the lost motion between the elements will be taken up and a change in the setting of potentiometer 60 will be effected. It will of course be appreciated that the output of the potentiometer 60 will be increased or decreased depending on whether there is clockwise or counterclockwise rotation of ratchet wheel 40.

It will be understood that where every tenth charge causes energization of electromagnet 36 and a consequent rotation of ratchet wheel 40 one step counterclockwise and where an underweight charge causes energization of electromagnet 48 and a consequent rotation of a ratchet wheel 40 one step clockwise, for an average of one underweight charge in 10, there would be a corresponding one step clockwise rotation of ratchet wheel 40 for each one step counterclockwise rotation. Hence ratchet wheel 40 will rotate back and forth about a fixed angular position. The lost motion in coupling mechanism 58 will prevent a change in the setting of potentiometer 60 under these circumstances. If however more than 10 percent of the charges are underweight the electromagnet 48 will be energized more frequently than electromagnet 36 and will cause shaft 56 to move clockwise to change, through coupling 56, the setting of potentiometer 60. This change in the setting of potentiometer 60 will cause an increase in the weight level at which the internal relay in control amplifier 20 operates so that there will be an increase in the amount of charge added to weigh bucket 16, the operation of vibratory feeder 14 thus being terminated when a heavier weight is reached. This increase in weight of the average charge delivered will be reflected in a decrease in the percentage of underweight charges. The unbalance between the number of times electromagnets 36 and 48 are energized will continue to produce a change in the setting of potentiometer 60 until a setting is reached corresponding to a situation where an average of 10 percent of the charges are delivered underweight. Under these circumstances, the angular position of ratchet wheel 40 will oscillate about a fixed point corresponding to that setting.

To briefly review the operation of the system of FIG. 4 the cycle begins with vibratory feeder 14 filling weigh bucket 16. The contents of weigh bucket 16 are dumped into checkweigh bucket 24 and if the weight of charge is below the minimum acceptable level the relay control for auxiliary vibratory feeder 22 is energized. When the weight of the charge in checkweigh bucket 24 is brought up to the minimum level, feeder 22 is de-energized and the checkweigh bucket 24 dumped into receptacle R.

The total number of charges produced is counted by the arrangement including stepping switch 30 which is set to provide a one step counterclockwise rotation of ratchet wheel 40 for every tenth charge delivered. A one step clockwise rotation of ratchet wheel 40 is produced for each time an underweight charge is delivered to checkweigh bucket 24. A net rotation of ratchet wheel 40 indicates that the desired percentage is not being maintained and is reflected in a corresponding change in the setting of potentiometer 60 and hence in an increase or decrease in the feeder adjustment to produce the desired ratio.

It is noted that where it is desired to hold a different point on the distribution curve, for example, $-1$ sigma, a six step switch could be substituted for switch 30. Selection of this point of the distribution curve corresponds to 16.87 percent of the charges being delivered underweight whereas the use of a six-step switch dictates maintaining one in six charges underweight, a percentage of 16.67 percent. Where the desired ratio does not work out into easy multiples such as described hereinbefore electromagnets 42 and 48 can each drive different ratchet wheels. Thus by using each ratchet wheel to drive an input to a differential through a suitable gearing arrangement almost any ratio can be achieved. The output of the differential can, as before, be used to control a potentiometer through a suitable coupling. Although it is preferred that the number of underweight charges be compared with the total number of charges to ascertain whether the selected ratio is being maintained, the number of underweight charges can be compared with the number of charges falling above the selected minimum level through the use of an interrogation relay arrangement.

As mentioned hereinabove the system of the present invention will compensate for changes in particle size in that any decrease in the weight of the charges produced due to changes in particle size will be reflected in an increase feeder adjustment in order that the selected ratio be maintained. This operation contrasts with that of systems wherein an average weight is maintained in that such systems provide no such compensation and thus are subject to producing unnecessary product giveaway or to producing an excessive number of underweights where there is a change in the particle size of the product.

It is noted that the method of the invention in addition to reducing the amount of giveaway, can be used to ensure that the customer will receive more overfilled packages than underfilled. For example by holding 40 percent of the packages below the printed weight and 60 percent above it will be ensured that the customer will get slightly more product than the printed weight. It will be appreciated that here maintaining average package weights is important rather than assuring that the packages weights all fall above a predetermined minimum and thus filling of the underweight packages is not required.

A number of variations may be made in the embodiment shown in FIG. 4. For example, a single feeder-scale arrangement may be used, with the same scale used to perform the checkweighing. Thus, although the invention has been described in detail with particular reference to preferred embodiments thereof, it will be understood by those skilled in the art that further variations and modifications other than those specifically described can be effected within the scope and spirit of the invention as set forth hereinabove and as defined in the appended claims.

I Claim:

1. A method for controlling the weights of product charges wherein the weights are normally distributed along a curve about a mean weight and wherein normally the weights of all product charges are above a minimum allowable weight with half the product charges on each side of the mean weight comprising the steps of selecting a minimum allowable weight level below the mean weight, maintaining a predetermined ratio between total product charges and product charges falling below said minimum allowable weight level whereby a number of product charges below the minimum allowable weight are deliberately produced and a greater number of product charges are produced on the underweight side of said mean weight than on the overweight side of said mean weight, adding product to the product charges below the minimum allowable weight to bring the product charges over the minimum allowable weight whereby product giveaway is substantially reduced.

2. A method for controlling the weights of product charges as claimed in claim 1 wherein the step of maintaining said predetermined ratio comprises counting the total number of charges produced, counting the number of underweight charges produced, and comparing the total number of charges with the number of underweight charges to determine whether said ratio is being maintained.

3. A method for controlling the weights of product charges as claimed in claim 1 further comprising converting the number of charges counted into a control signal corresponding to said predetermined ratio such that the percentage of said control signals produced relative to the total number of charges counted approximates the predetermined ratio between the number of underweight charges and the total number of charges produced and comparing the number of occurrences of the control signal with the number of occurrences of a signal corresponding to the actual number of underweight charges counted.

4. A method for controlling the weights of product charges as claimed in claim 3 further comprising controlling the production of the charges in accordance with the results of the comparison step.

5. A method for controlling the weights of product charges as claimed in claim 4 comprising feeding product from a first feeder to weigh bucket, each operation of said feeder providing a count of the total number of charges produced; weighing the charge in said weigh bucket; dumping the weighed charge into a checkweigh bucket; checkweighing the charge in said checkweigh bucket; feeding product into said checkweigh bucket when the weight falls below said predetermined level; and providing a count of the number of charges in said checkweigh bucket whose weights fall below said predetermined level by providing a control signal each time said second feeder is energized; said controlling step comprising adjusting setting of the feeder in accordance with said comparison.

* * * * *